US012720652B2

(12) United States Patent
Dupras et al.

(10) Patent No.: US 12,720,652 B2
(45) Date of Patent: *Aug. 25, 2026

(54) METHOD AND SYSTEM OF SUPPLEMENTING THE SPECTRAL CONTENT OF ILLUMINATING LIGHT BASED ON A TARGET ILLUMINATION SPECTRUM

(71) Applicant: SOLLUM TECHNOLOGIES INC., Montréal (CA)

(72) Inventors: Gabriel Dupras, Otterburn Park (CA); Jacques Poirier, Huntingdon (CA); François Roy-Moisan, Verdun (CA); Charles Smith, Longueuil (CA); Alban Derville, Montréal (CA); Danny Bouthot, Saint-Hubert (CA); Louis Brun, Mont-Royal (CA); Guillaume Tourville, Montréal (CA)

(73) Assignee: SOLLUM TECHNOLOGIES INC., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,953

(22) Filed: May 13, 2024

(65) Prior Publication Data

US 2024/0298391 A1 Sep. 5, 2024

Related U.S. Application Data

(63) Continuation of application No. 17/416,444, filed as application No. PCT/CA2019/051837 on Dec. 17, 2019, now Pat. No. 11,985,742.

(Continued)

(51) Int. Cl.
*H05B 45/22* (2020.01)
*H05B 47/11* (2020.01)

(52) U.S. Cl.
CPC .............. *H05B 45/22* (2020.01); *H05B 47/11* (2020.01)

(58) Field of Classification Search
CPC .......... H05B 45/22; H05B 47/11; Y02B 20/40
See application file for complete search history.

(56) References Cited

U.S. PATENT DOCUMENTS 8,415,897 B2 * 4/2013 Choong ................ H05B 45/10 315/308
9,655,191 B2 5/2017 Vissenberg et al.

(Continued)

FOREIGN PATENT DOCUMENTS

JP H11162216 A * 6/1999
WO 2018157063 A1 8/2018

OTHER PUBLICATIONS

ISA Canadian Intellectual Property Office, International Search Report Issued in Application No. PCT/CA2019/051837, Mar. 5, 2020, WIPO, 4 pages.

(Continued)

*Primary Examiner* — Raymond R Chai
(74) *Attorney, Agent, or Firm* — McCoy Russell LLP

(57) ABSTRACT

A method and system of supplementing a main illuminating light with a supplementary illuminating light using a plurality of solid-state light emitters to illuminate a space according to a target illumination spectrum are provided. The method can include determining or receiving a reference illumination spectrum associated with the main illuminating light. The method can also include determining a spectral deviation between the reference illumination spectrum and the target illumination spectrum. The method can further include controlling the solid-state light emitters to emit respective emitter beams forming the supplementary illuminating light and illuminating the space along with the main illuminating light, the emitter beams having respective (Continued)

emitter spectra together defining a supplementary illumination spectrum of the supplementary illuminating light. The controlling can include adjusting the emitter spectra to match the supplementary illumination spectrum to the spectral deviation and illuminate the space according to the target illumination spectrum.

20 Claims, 7 Drawing Sheets

Related U.S. Application Data

(60) Provisional application No. 62/782,872, filed on Dec. 20, 2018.

(56) References Cited

U.S. PATENT DOCUMENTS

| | | | | |
|---|---|---|---|---|
| 10,292,246 | B2 | 5/2019 | Rajagopalan et al. | |
| 2004/0105261 | A1 | 6/2004 | Ducharme et al. | |
| 2007/0108846 | A1 | 5/2007 | Ashdown | |
| 2011/0137757 | A1 | 6/2011 | Paolini et al. | |
| 2016/0192454 | A1 | 6/2016 | Simonian et al. | |
| 2016/0254416 | A1 * | 9/2016 | Cheng ................ | H10H 20/8512 257/89 |
| 2016/0374176 | A1 * | 12/2016 | Van Der Poel ........ | H05B 45/22 |
| 2017/0238396 | A1 | 8/2017 | Knibbe et al. | |
| 2018/0014375 | A1 | 1/2018 | Dupras et al. | |
| 2018/0270928 | A1 * | 9/2018 | Simonian ............... | H05B 45/22 |
| 2019/0082516 | A1 | 3/2019 | Wölfing et al. | |

OTHER PUBLICATIONS

ISA Canadian Intellectual Property Office, Written Opinion of the International Searching Authority Issued in Application No. PCT/CA2019/051837, Mar. 5, 2020, WIPO, 5 pages.

International Bureau of WIPO, International Preliminary Report on Patentability Issued in Application No. PCT/CA2019/051837, Jun. 16, 2021, WIPO, 6 pages.

European Patent Office, Extended European Search Report Issued in Application No. 19900383.1, Aug. 12, 2022, Germany, 9 pages.

* cited by examiner

METHOD AND SYSTEM OF SUPPLEMENTING THE SPECTRAL CONTENT OF ILLUMINATING LIGHT BASED ON A TARGET ILLUMINATION SPECTRUM

CROSS-REFERENCE TO RELATED PATENT APPLICATIONS

The present application is a continuation of U.S. Non-Provisional patent application Ser. No. 17/416,444, entitled "METHOD AND SYSTEM OF SUPPLEMENTING THE SPECTRAL CONTENT OF ILLUMINATING LIGHT BASED ON A TARGET ILLUMINATION SPECTRUM," and filed on Jun. 18, 2021. U.S. Non-Provisional patent application Ser. No. 17/416,444 is a U.S. National Phase of International Application No. PCT/CA2019/051837 entitled "METHOD AND SYSTEM OF SUPPLEMENTING THE SPECTRAL CONTENT OF ILLUMINATING LIGHT BASED ON A TARGET ILLUMINATION SPECTRUM," and filed on Dec. 17, 2019. International Application No. PCT/CA2019/051837 claims priority to U.S. Provisional Patent Application No. 62/782,872 filed on Dec. 20, 2018. The entire contents of each the above-listed applications are hereby incorporated by reference for all purposes.

TECHNICAL FIELD

The technical field generally relates to lighting, and more particularly, to a method and system of supplementing the spectral content of a main illuminating light based on a target illumination spectrum.

BACKGROUND AND SUMMARY

Lighting devices that aim to reproduce or emulate natural light (e.g., sunlight, moonlight, or starlight) are known in the art. Referring to FIG. 1 (PRIOR ART), there is illustrated a multi-channel lighting system 10 including a plurality of light-emitting diodes (LEDs) $\mathbf{14}_1$, $\mathbf{14}_2$, . . . $\mathbf{14}_n$, such as the one described in co-assigned U.S. Pat. Appl. Pub. No. 2018/0014375 A1 (DUPRAS et al.). Such a lighting system 10 can be used to generate illuminating light 12 representative of natural light. FIG. 2 (PRIOR ART) is a graph showing the individual spectral profiles of a set of 19 LEDs used to generate natural light at a color temperature of about 4000 K, representative of early morning light, as well as their combined spectral profile ("TOTAL") compared with the natural light spectral profile ("Standard") intended to be reproduced. The illustrated combined spectral profile can be obtained using the lighting system 10 of FIG. 1 (PRIOR ART). In DUPRAS et al., while the lighting system aims to reproduce visible natural light, by excluding infrared and ultraviolet radiation, the disclosed system can also be used to generate illuminating light having a spectrum extending to non-visible regions of the electromagnetic spectrum.

Different lighting systems and technologies generally exhibit different spectral profiles. For example, conventional high-pressure sodium (HPS) lamps generally emit a predominantly yellow light output having an illumination spectrum concentrated between 560 nanometers (nm) and 630 nm. Meanwhile, conventional white-light LED lighting devices can emit light having a narrow blue peak around 460 nm and, through phosphor conversion, a broad peak between 520 nm and 640 nm, thus providing an illumination spectrum encompassing the three primary colors-blue, green, and red-making up white light. However, in the lighting field, such systems are not considered to be "full-spectrum" lighting systems, due to the presence of missing spectral regions, or gaps, in their spectral power distribution.

Another challenge in reproducing natural light is that the spectral profile of natural light varies as a function of geographic location, time of day, time of year, weather, cloud coverage, and other meteorological or environmental factors. These variations in natural light spectral content are observed predominantly between about 300 nm and 800 nm. The spectral distribution and intensity of natural light are key parameters in various high-performance lighting applications. For example, even minor variations in spectral distribution and/or intensity can significantly affect plant production, notably in terms of growth speed, yield, and quality.

Challenges therefore remain in the field of spectrally enhanced lighting, particularly for natural lighting applications.

The present description generally relates to lighting techniques for supplementing a main illumination of natural and/or artificial origin with a supplementary illuminating light produced by a plurality of solid-state light emitters to generate a supplemented illumination having a supplemented illumination spectrum that matches a target illumination spectrum.

In accordance with an aspect, there is provided a method of supplementing a main illuminating light with a supplementary illuminating light from a plurality of solid-state light emitters to illuminate a space according to a target illumination spectrum. The method includes:

- determining or receiving a reference illumination spectrum associated with the main illuminating light;
- determining a spectral deviation between the reference illumination spectrum and the target illumination spectrum; and
- controlling the plurality of solid-state light emitters to emit a respective plurality of emitter beams forming the supplementary illuminating light and illuminating the space along with the main illuminating light, the plurality of emitter beams having a respective plurality of emitter spectra together defining a supplementary illumination spectrum of the supplementary illuminating light, the controlling including adjusting the plurality of emitter spectra to match the supplementary illumination spectrum to the spectral deviation and illuminate the space according to the target illumination spectrum.

In one embodiment, the main illuminating light originates from one or more natural light sources. In one example, the one or more natural light sources can include sunlight, moonlight, starlight, or a combination thereof.

In one embodiment, the main illuminating light originates from one or more artificial light sources. In one example, the one or more artificial light sources can include an incandescent light source, a fluorescent light source, a high-intensity discharge light source, a solid-state light source, or a combination thereof.

In one embodiment, the main illuminating light originates from a combination of at least one natural light source and at least one natural light source.

In one embodiment, the plurality of solid-state light emitters includes a semiconductor light-emitting diode, a semiconductor laser diode, a vertical-cavity surface-emitting laser, an organic light-emitting diode, a polymer light-emitting diode, or a combination thereof.

In one embodiment, the method further includes selecting the target illumination spectrum to replicate natural light. In one example, the replicated natural light can include sunlight, moonlight, starlight, or a combination thereof. In another example, the replicated natural light can be representative of lighting conditions on Earth. In one example, the lighting conditions on Earth can be representative of a time of day, a time of year, a geographical location, meteorological conditions, or a combination thereof.

In one embodiment, the method can further include selecting the target illumination spectrum to replicate artificial light. In one example, the artificial light can be representative of incandescent lighting, fluorescent lighting, high-intensity discharge lighting, solid-state lighting, or a combination thereof.

In one embodiment, the method can further include selecting the target illumination spectrum to correspond to a combination of natural light and artificial light.

In one embodiment, the target illumination spectrum is constant as a function of time over an illumination period.

In one embodiment, the target illumination spectrum varies as a function of time over an illumination period.

In one embodiment, the target illumination spectrum is determined, at least in part, based on a selection from a database. In one example, the target illumination spectrum can correspond to a standard illuminant or a correlated color temperature.

In one embodiment, the target illumination spectrum is determined, at least in part, based on user input.

In one embodiment, the target illumination spectrum encompasses visible light wavelengths.

In one embodiment, the target illumination spectrum encompasses non-visible light wavelengths.

In one embodiment, the target illumination spectrum has a color temperature ranging from about 1000 K to about 35000 K, for example between 1500 K and 8000 K.

In one embodiment, determining or receiving the reference illumination spectrum includes selecting the reference illumination spectrum from a database containing a plurality of predefined illumination spectra.

In one embodiment, determining or receiving the reference illumination spectrum includes determining the reference illumination spectrum based on one or more predictive factors related to the space to be illuminated. In one example, the one or more predictive factors can be based on geographical information, temporal information, weather information, or a combination thereof.

In one embodiment, the method can further include updating the reference illumination spectrum over time based on changes in the one or more predictive factors.

In one embodiment, determining or receiving the reference illumination spectrum includes:

- using a spectrally resolved sensor to measure a spectral response of the main illuminating light; and
- determining the reference illumination spectrum from the measured spectral response.

In one embodiment, determining the spectral deviation between the reference illumination spectrum and the target illumination spectrum includes subtracting the reference illumination spectrum from the target illumination spectrum.

In one embodiment, determining the spectral deviation between the reference illumination spectrum and the target illumination spectrum includes monitoring the spectral deviation over time for changes, and adjusting the plurality of emitter spectra includes, upon detection that the spectral deviation has changed, adjusting the plurality of emitter spectra to keep the supplementary illumination spectrum matched to the spectral deviation.

In one embodiment, monitoring the spectral deviation includes performing continuous or intermittent real-time measurements of the reference illumination spectrum, the supplementary illumination spectrum, or both the reference illumination spectrum and the supplementary illumination spectrum.

In one embodiment, adjusting the plurality of emitter spectra includes individually adjusting an intensity level of each emitter spectra.

In one embodiment, controlling the plurality of solid-state light emitters is performed according to a pulse-width modulation scheme.

In accordance with another aspect, there is provided a non-transitory computer readable storage medium having stored thereon computer executable instructions that, when executed by a processor, cause the processor to perform a method as disclosed herein.

In accordance with another aspect, there is provided a computer device for use with a lighting system, the computer device including a processor and a non-transitory computer readable storage medium such as disclosed herein, the non-transitory computer readable storage medium being operatively coupled to the processor.

In accordance with another aspect, there is provided a lighting system for supplementing a main illuminating light with a supplementary illuminating light to illuminate a space according to a target illumination spectrum, the lighting system including:

- a plurality of solid-state light emitters configured to emit a respective plurality of emitter beams forming the supplementary illuminating light and illuminating the space along with the main illuminating light, the plurality of emitter beams having a respective plurality of emitter spectra together defining a supplementary illumination spectrum of the supplementary illuminating light; and
- a control and processing unit operatively coupled to the plurality of solid-state light emitters, the control and processing unit being configured to:
- determine or receive a reference illumination spectrum associated with the main illuminating light;
- determine a spectral deviation between the reference illumination spectrum and the target illumination spectrum; and
- control the plurality of solid-state light emitters by adjusting the plurality of emitter spectra to match the supplementary illumination spectrum to the spectral deviation and illuminate the space according to the target illumination spectrum.

In one embodiment, the plurality of solid-state light emitters includes a semiconductor light-emitting diode, a semiconductor laser diode, a vertical-cavity surface-emitting laser, an organic light-emitting diode, a polymer light-emitting diode, or a combination thereof.

In one embodiment, a number of the plurality of solid-state light emitters ranges between six and twenty.

In one embodiment, at least one of the emitter spectra encompasses visible light wavelengths.

In one embodiment, at least one of the emitter spectra encompasses non-visible light wavelengths.

In one embodiment, the plurality of solid-state light emitters includes at least one colored-light emitter.

In one embodiment, the plurality of solid-state light emitters includes at least one white-light emitter.

In one embodiment, the control and processing unit is configured to select the target illumination spectrum to replicate natural light.

In one embodiment, the control and processing unit is configured to select the target illumination spectrum to replicate artificial light.

In one embodiment, the control and processing unit is configured to select the target illumination spectrum as a time-constant quantity over an illumination period.

In one embodiment, the control and processing unit is configured to select the target illumination spectrum as a time-varying quantity over an illumination period.

In one embodiment, the control and processing unit is configured to determine the spectral deviation by subtracting the reference illumination spectrum from the target illumination spectrum.

In one embodiment, the control and processing unit is configured to determine or receive the reference illumination spectrum from a database containing a plurality of predefined illumination spectra.

In one embodiment, wherein the control and processing unit is configured to determine or receive the reference illumination spectrum based on one or more predictive factors related to the space to be illuminated. In one example, the one or more predictive factors can be based on geographical information, temporal information, weather information, or a combination thereof. In one example, the control and processing unit can be configured to update the reference illumination spectrum over time based on changes in the one or more predictive factors.

In one embodiment, the lighting system includes at least one spectrally resolved sensor to measure a spectral response of the main illuminating light. In one example, the control and processing unit is configured to determine the reference illumination spectrum from the measured spectral response.

In one embodiment, the control and processing unit is configured to monitor the spectral deviation over time for changes, and upon detection that the spectral deviation has changed, adjust the plurality of emitter spectra to keep the supplementary illumination spectrum matched to the spectral deviation. In one example, the lighting system further includes at least one spectrally resolved sensor to perform continuous or intermittent real-time measurements of the reference illumination spectrum, the supplementary illumination spectrum, or both the reference illumination spectrum and the supplementary illumination spectrum, wherein the control and processing unit is configured to monitor the spectral deviation over time for changes based on the continuous or intermittent real-time measurements.

In one embodiment, the control and processing unit is configured to adjust the plurality of emitter spectra by individually adjusting an intensity level of each emitter spectra.

In one embodiment, the control and processing unit is configured to adjust the plurality of emitter spectra to all be different from one another.

In one embodiment, the control and processing unit is configured to adjust the emitter spectra of a subset of the plurality of solid-state light emitters to be identical to one another.

In one embodiment, the control and processing unit is configured to control the plurality of solid-state light emitters according to a pulse-width modulation scheme.

In one embodiment, the lighting system further includes a beam combining assembly configured to combine the emitter beams emitted by the plurality of solid-state light emitters into the supplementary illuminating light.

In accordance with another aspect, there is provided a method of supplementing a main illuminating light to illuminate a space according to a target illumination spectrum, the method including:

- determining or receiving a reference illumination spectrum associated with the main illuminating light;
- determining a spectral deviation between the reference illumination spectrum and the target illumination spectrum;
- providing a plurality of solid-state light emitters, each solid-state light emitter being configured to emit an emitter beam according to an individual emitter spectrum;
- combining the plurality of emitter beams into a supplementary illuminating light for illumination of the space together with the main illuminating light, the supplementary illuminating light having a supplementary illumination spectrum defined from a combination of the individual emitter spectra of the plurality of emitter beams; and
- controlling the plurality of solid-state light emitters to adjust the supplementary illumination spectrum of the supplementary illuminating light to match the spectral deviation and illuminate the space according to the target illumination spectrum.

In accordance with another aspect, there is provided a method of controlling a lighting system for supplementing a main illuminating light with a supplementary illuminating light to illuminate a space according to a target illumination spectrum, the lighting system including a plurality of solid-state light emitters, each of which configured to emit an emitter beam according to an individual emitter spectrum, and a beam combining assembly configured to combine the emitter beams emitted by the plurality of solid-state light emitters into the supplementary illuminating light for illumination of the space together with the main illuminating light, the supplementary illuminating light having a supplementary illumination spectrum defined from a combination of the individual emitter spectra of the plurality of emitter beams, the method including:

- determining or receiving a reference illumination spectrum associated with the main illuminating light;
- determining a spectral deviation between the reference illumination spectrum and the target illumination spectrum; and
- controlling the plurality of solid-state light emitters to adjust the supplementary illumination spectrum of the supplementary illuminating light to match the spectral deviation and illuminate the space according to the target illumination spectrum.

In accordance with another aspect, there is provided a non-transitory computer readable storage medium having stored thereon computer executable instructions that, when executed by a processor, cause the processor to perform a method of controlling a lighting system as described herein.

In accordance with another aspect, there is provided a computer device for use with a lighting system, the computer device including:

- a processor; and
- a non-transitory computer readable storage medium as described herein, the non-transitory computer readable storage medium being operatively coupled to the processor.

In accordance with another aspect, there is provided a lighting system for supplementing a main illuminating light to illuminate a space according to a target illumination spectrum, the lighting system including:

- a plurality of solid-state light emitters, each solid-state light emitter being configured to emit an emitter beam according to an individual emitter spectrum;
- a beam combining assembly configured to combine the emitter beams emitted by the plurality of solid-state light emitters into a supplementary illuminating light for illumination of the space together with the main illuminating light, the supplementary illuminating light having a supplementary illumination spectrum defined from a combination of the individual emitter spectra of the plurality of emitter beams; and
- a control and processing unit operatively coupled to the plurality of solid-state light emitters, the control and processing unit being configured to:
- determine or receive a reference illumination spectrum associated with the main illuminating light;
- determine a spectral deviation between the reference illumination spectrum and the target illumination spectrum; and
- control the plurality of solid-state light emitters to adjust the supplementary illumination spectrum of the supplementary illuminating light to match the spectral deviation and illuminate the space according to the target illumination spectrum.

It is to be noted that other method and process steps may be performed prior to, during, or after the steps described herein. The order of one or more steps may also differ, and some of the steps may be omitted, repeated, and/or combined, depending on the application. It is also to be noted that some method and process steps can be performed using various data processing techniques, which can be implemented in hardware, software, firmware, or any combination thereof.

Other objects, features, and advantages of the present description will become more apparent upon reading of the following non-restrictive description of specific embodiments thereof, given by way of example only with reference to the appended drawings. Although specific features described in the foregoing summary and the following detailed description may be described with respect to specific embodiments or aspects, it should be noted that these specific features can be combined with one another unless stated otherwise.

DETAILED DESCRIPTION

Figure 1:
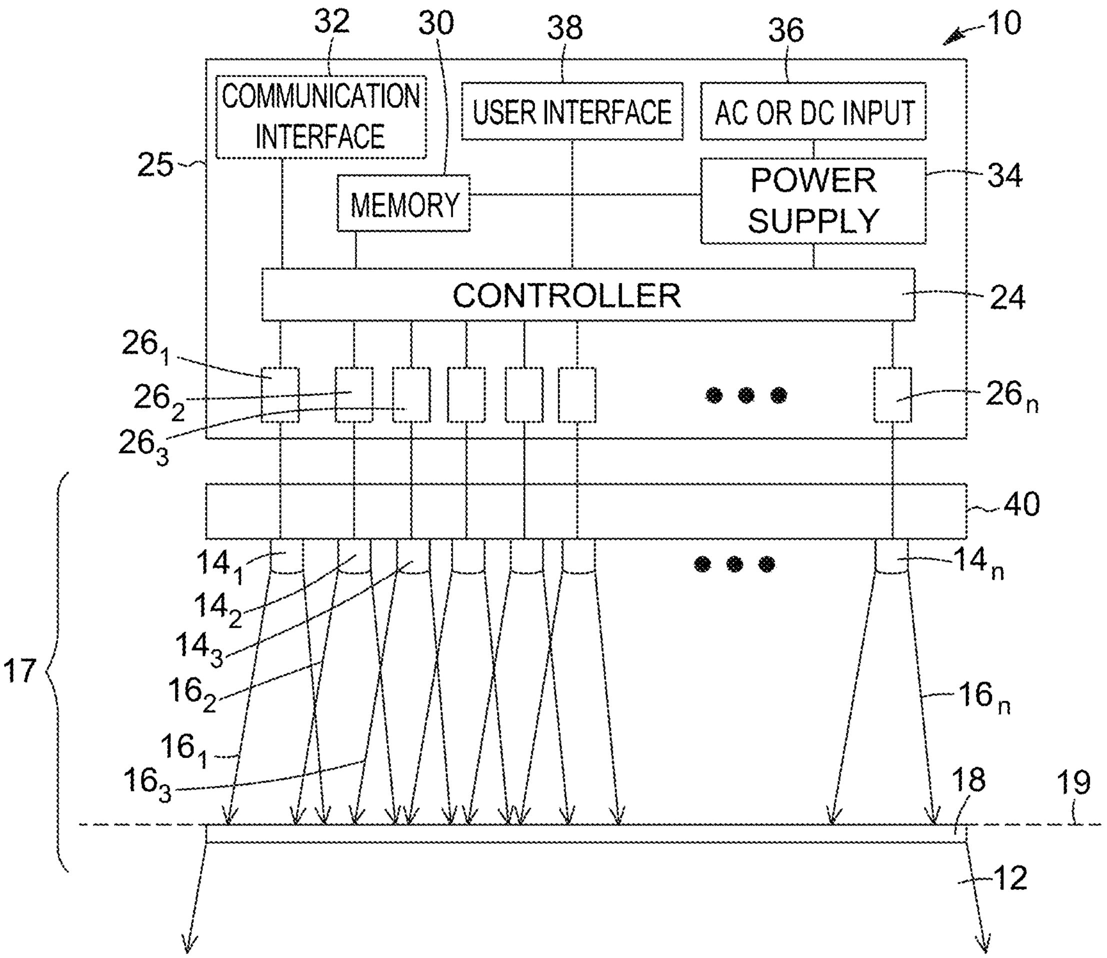
Fig. 1 (PRIOR ART)
FIG. 1 (PRIOR ART) is a schematic representation of a conventional multiple-LED lighting system.
Figure 2:
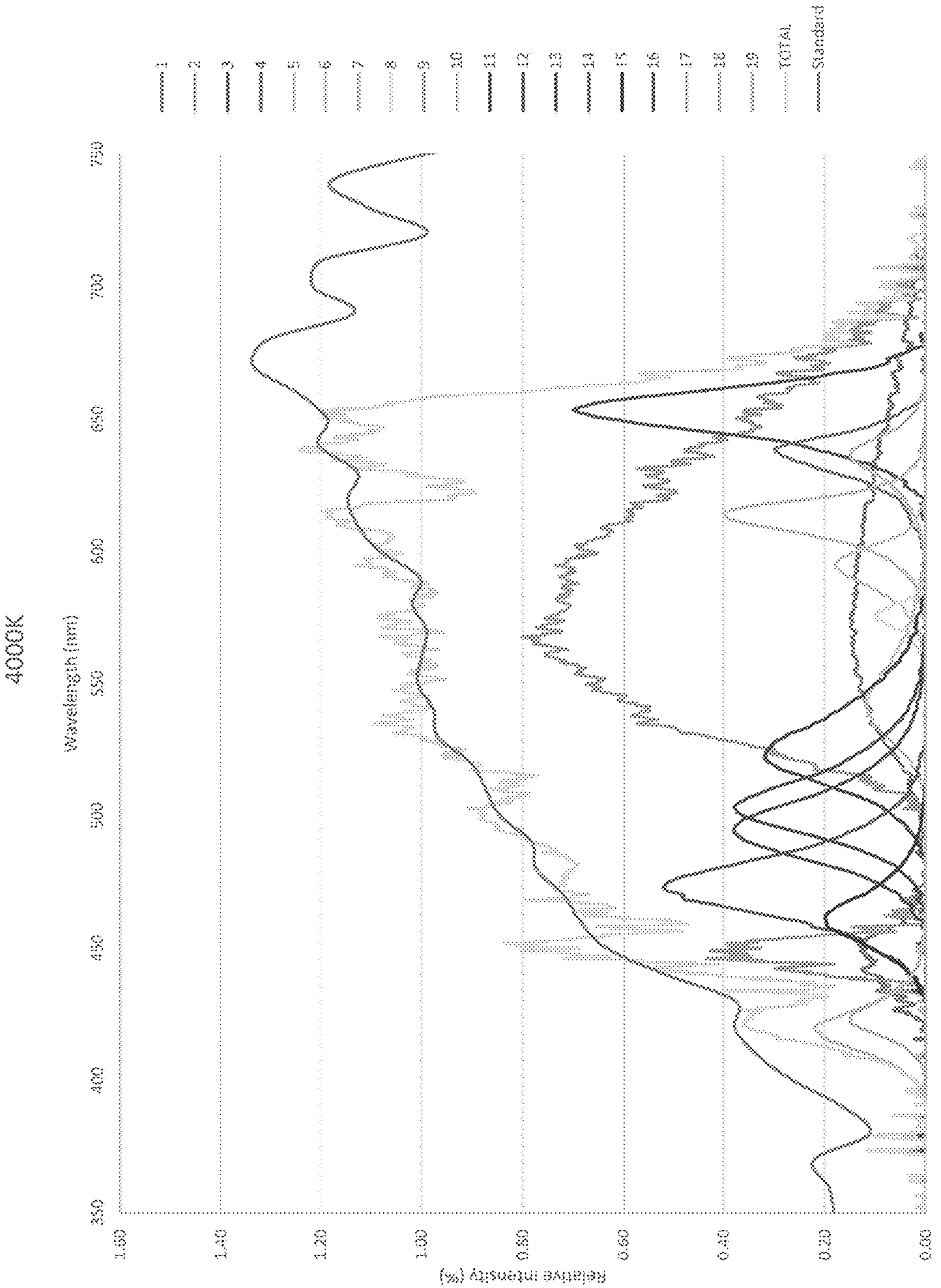
Fig. 2 (PRIOR ART)
FIG. 2 (PRIOR ART) is a graph showing the individual spectral profiles of illuminating light emitted by a set of 19 LEDs of a multiple-LED lighting system similar to the one depicted in FIG. 1 (PRIOR ART), with relative intensities configured to provide natural light at a color temperature of about 4000 K, as well as their combined spectral profile ("TOTAL") compared with the natural light spectral profile ("Standard") that they intend to reproduce.

In the present description, similar features in the drawings have been given similar reference numerals. To avoid cluttering certain figures, some elements may not be indicated if they were already identified in a preceding figure. It is appreciated that the elements of the drawings are not necessarily depicted to scale, since emphasis is placed on clearly illustrating the structure and operation of the present embodiments. Furthermore, positional descriptors indicating the location and/or orientation of one element with respect to another element are used for case and clarity of description. Unless otherwise indicated, these positional descriptors should be taken in the context of the figures and should not be considered limiting. It will be appreciated that such spatially relative terms are intended to encompass different orientations in the use or operation of the present embodiments, in addition to the orientations exemplified in the figures.

In the present description, the terms “a”, “an”, and “one” are defined to mean “at least one”, that is, these terms do not exclude a plural number of elements, unless stated otherwise.

Terms such as “substantially”, “generally”, and “about”, that modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term “about” can refer to a range of numbers that one skilled in the art would consider equivalent to the stated value (e.g., having the same or equivalent function or result). In some instances, the term “about” means a variation of ±10 percent of the stated value. It is noted that all numeric values used herein are assumed to be modified by the term “about”, unless stated otherwise.

The terms “match”, “matching”, and “matched” are intended to refer to a condition in which two elements are either the same or within some predetermined tolerance of each other. That is, these terms are meant to encompass not only “exactly” or “identically” matching the two elements but also “substantially”, “approximately”, “subjectively”, or “sufficiently” matching the two elements, as well as providing a higher or best match among a plurality of matching possibilities.

In the present description, the terms “connected” and “coupled”, and derivatives and variants thereof, are intended to refer to any structural or functional connection or coupling, either direct or indirect, between two or more elements. The connection or coupling between the elements may be, for example, mechanical, optical, electrical, thermal, chemical, fluidic, magnetic, logical, operational, or any combination thereof.

In the present description, the term “concurrently” is intended to refer to two processes that occur during coincident or overlapping time periods. The term “concurrently” does not necessarily imply complete synchronicity, and encompasses various scenarios including: time-coincident or simultaneous occurrence of two processes; occurrence of a first process that both begins and ends during the duration of a second process; and occurrence of a first process that begins during the duration of a second process, but ends after the completion of the second process.

In the present description, the term “based on” is intended to mean “based at least in part on” and encompass both “based solely on” and “based partly on”. In particular, the term “based on” could also be understood as meaning “depending on”, “representative of”, “indicative of”, “associated with”, and the like.

The present description generally relates to a method and system that use a set of solid-state light emitters having different emission spectra to supplement or enhance the illumination spectrum of a main illumination originating from one or more natural and/or artificial light sources.

The present techniques have potential use in various applications that may require or benefit from spectrally enhanced lighting conditions. Non-limiting examples of possible fields of use include horticulture, agriculture and other grow light applications, animal husbandry, industrial lighting, commercial lighting, outdoor lighting, household lighting, workplace and learning environment lighting (where natural light can increase productivity and provide health benefits), vehicle lighting, human-centric lighting, medical and healthcare lighting, and the like.

In the present description, the terms “light” and “optical”, and variants and derivatives thereof, are intended to refer to radiation in any appropriate region of the electromagnetic spectrum. The terms “light” and “optical” are therefore not limited to visible light but can also include, without being limited to, the infrared and ultraviolet regions. The visible spectrum is commonly defined as encompassing wavelengths ranging from about 40 nm to about 700 nm, between the infrared spectrum, which is commonly defined as encompassing wavelengths ranging from about 700 nm to about 1000 μm, and the ultraviolet spectrum, which is commonly defined as encompassing wavelengths ranging from about 10 nm to about 400 nm. For example, in some implementations, the present techniques can be used with electromagnetic signals having wavelengths ranging from about 250 nm to about 2500 nm, particularly from about 250 nm to about 1000 nm or 1500 nm, and more particularly from about 350 nm to about 800 nm. However, these ranges are provided for illustrative purposes only and some implementations of the present techniques may operate outside these ranges. In addition, it is appreciated that the definitions of the ultraviolet, visible, and infrared regions in terms of spectral ranges, as well as their limits, can vary depending on the technical field under consideration, and are not meant to limit the scope of application of the present techniques.

In the present description, the term “natural light”, and variants and derivatives thereof, is intended to refer to light having spectral characteristics corresponding or similar to those of sunlight, moonlight, or starlight. In contrast, the term “artificial light”, and variants and derivatives thereof, is intended to refer herein to any light that is produced by human-made light sources. As discussed above, the spectral profile of natural light, particularly sunlight, varies as a function of geographic location, time of day, time of year, weather, cloud coverage, and several other factors. Several standards are known in the art to provide a spectral reference for natural light. For example, the Commission internationale de l’éclairage (CIE) has established the D series of well-defined daylight standard illuminants representing natural light under different conditions. One well-known standard is CIE Standard Illuminant D65, which is a daylight illuminant that intends to represent the average midday light in Western or Northern Europe. Other examples of CIE Standard Illuminants for daylight include the D50, D55, and D75 standard illuminants. Sunlight, which refers to the total spectrum of electromagnetic radiation emitted by the Sun and reaching the Earth, has a broad spectral range including ultraviolet radiation, visible light, and infrared radiation. Accordingly, standard illuminants extend within the solar radiation spectrum. For example, Standard Illuminant D65 extends from 300 nm to 830 nm.

Figure 3:
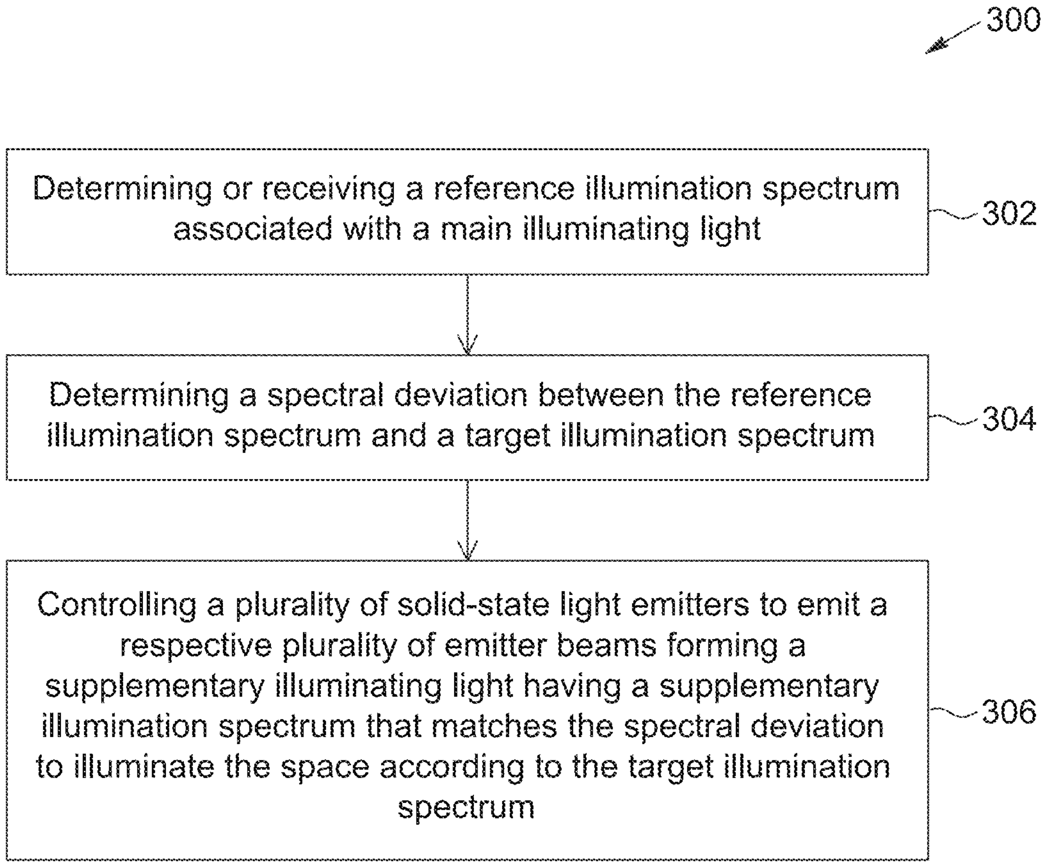
FIG. 3 is a flow diagram of a method of supplementing a main illuminating light with a supplementary illuminating light from a plurality of solid-state light emitters to illuminate a space according to a target illumination spectrum, in accordance with a possible embodiment.

Referring to FIG. 3, there is provided a flow diagram of an embodiment of a method 300 of supplementing a main illuminating light with a supplementary illuminating light from a plurality of solid-state light emitters to illuminate a space according to a target illumination spectrum.

In the present description, the term “main illuminating light” or “main illumination” is intended to refer to any light used for illuminating a space and whose illumination spectrum can be enhanced, optimized, improved, supported, completed, or otherwise supplemented according to the present techniques. Depending on the application, the main illuminating light can originate from or be produced by one or more artificial light sources, one or more natural light sources, or a combination of at least one natural light source and at least one artificial light source. Non-limiting examples of natural light sources or conditions include sunlight, daylight, nightlight, moonlight, starlight, twilight, lightning, firelight, and a combination thereof. Non-limiting examples of artificial light sources include incandescent light sources; fluorescent light sources; high-intensity discharge (HID) light sources, such as mercury vapor, metal halide (MH), high-pressure sodium (HPS), and low-pressure sodium (LPS) light sources; other types of gas-discharge lamp sources; solid-state light sources, such as LED light sources and laser-based solid-state light sources; and non-solid-state laser sources.

In the present description, the term "space" is intended to encompass any region, scene, area, surface, environment, target, object, feature, or information of interest which can be illuminated according to the present techniques. Non-limiting examples of possible spaces include indoor and outdoor agricultural spaces and facilities, such as greenhouses and other horticultural infrastructures; business and commercial workspaces; public spaces; residential households; industrial facilities; healthcare facilities; and the like.

In the present description, the term "supplementary illuminating light" or "supplemental illumination" is intended to refer to light emitted by a lighting system including a plurality of solid-state light emitters having different spectral profiles to enhance or supplement the illumination spectrum of the main illuminating light. Specifically, the supplementary illuminating light produced by the plurality of solid-state light emitters is supplemented or added to the main illuminating light to achieve enhanced illumination having a target illumination spectrum.

In the present description, the term "solid-state light emitter" is intended to refer to any light-emitting device that operates by converting electrical energy into electromagnetic radiation through the recombination of electronic carriers (e.g., electrons and holes) in a light-emitting layer or region. The light-emitting layer or region can include, but is not limited to, silicon, silicon carbide, gallium nitride, and/or other semiconductor materials, and may or may not include a substrate, such as a sapphire, silicon, silicon carbide, and/or other microelectronic substrates. The solid-state light emitters can include both inorganic and organic light emitters, many of which are known to the skilled person and need not be described in detail herein. Non-limiting examples of types of solid-state light emitters include semiconductor light-emitting diodes (LEDs), semiconductor laser diodes, vertical-cavity surface-emitting lasers (VCSELs), other semiconductor light emitting devices or lamps, organic light-emitting diodes (OLEDs), and polymer light-emitting diode (PLEDs).

In the present description, the term "illumination spectrum" is intended to refer to the spectral power distribution of an illumination, that is, the distribution of power radiated by an illumination per unit area and per unit wavelength or frequency over a spectral region of the electromagnetic spectrum. It is appreciated that the term "illumination spectrum" can refer to the concentration or amount, as a function or wavelength or frequency, any suitable radiometric or photometric quantity. It is also appreciated that, in general, an illumination spectrum can be described in terms of its absolute intensity level or its relative spectral shape, or both its absolute intensity level and its relative spectral shape. Furthermore, in some embodiments, an illumination spectrum may be characterized by a color temperature, which can range from about 1000 K to about 35 000 K, for example between 1500 K and 8000 K.

In the present description, the term "target illumination spectrum" is intended to refer to any desired or required illumination spectrum to be achieved according to the present techniques as a result of supplementing the main illuminating light with the supplementary illuminating light emitted by the solid-state-based lighting system. As described in greater detail below, in the present techniques, the target illumination spectrum can be obtained by adjusting the illumination spectrum of the solid-state-based lighting system to match a difference or discrepancy between the illumination spectrum of the main illuminating light and the target illumination spectrum to be achieved.

In some implementations, target illumination spectrum can be selected to reproduce or replicate natural light. Non-limiting examples of natural light, such as sunlight, moonlight, and starlight, are given above. The replicated natural light can be representative of lighting conditions on Earth. The lighting conditions can relate or correspond to temporal (e.g., a time of day or a time of year), geographical (e.g., a location on Earth defined in terms of its latitude, longitude, and/or altitude), or meteorological (e.g., climate or weather conditions, such as sunny, rainy, cloudy, overcast, foggy, snowy, stormy, and smoggy) factors and parameters, or combinations of such factors and parameters. In particular, the present techniques can use the supplementary illuminating light to fill one or more gaps in the illumination spectrum of the main illuminating light to obtain a target illumination spectrum that is closer to natural lighting conditions. Depending on the application, the target illumination spectrum may or may not encompass visible light wavelengths and may or may encompass non-visible light wavelengths. In some embodiments, the present techniques can be used to improve the health, wellness, and/or productivity of plants, animals, or people, for example by transforming a cloudy-day illumination spectrum into a sunny-day illumination spectrum.

However, in other implementations, the target illumination spectrum may differ from natural lighting conditions. For example, in some scenarios, the target illumination spectrum generated according to the present techniques can differ from any actual or observable spectrum of solar radiation on Earth, for example by reducing or excluding spectral components that are considered undesirable and/or enhancing or adding spectral components that are required or considered advantageous.

In other implementations, the target illumination spectrum can be selected to reproduce or replicate artificial light. For example, the replicated artificial light can be representative of a particular type of artificial lighting, such as incandescent lighting, fluorescent lighting, HID lighting, solid-state lighting, or any combination thereof.

In yet other implementations, the target illumination spectrum can be selected to provide a combination of natural and artificial lighting.

Depending on the application, the target illumination spectrum may vary or be constant as a function of time over an illumination period during which the method is implemented.

In the former case, the target illumination spectrum can be a dynamic lighting scenario that is representative of a diurnal illumination cycle or a portion thereof. In some embodiments, the scenario timeline can be defined in terms of Earth-based time units (e.g., seconds, minutes, hours, days, weeks, months, years, and the like). However, in other embodiments, the duration of the dynamic lighting scenario can be defined based on other time units (e.g., a "day" in the dynamic lighting scenario may be shorter or longer than 24 hours, and a "week" may include less or more than seven days).

In general, the target illumination spectrum can be determined or selected depending on the application, notably on the nature of the space to be illuminated. For example, the target illumination spectrum may be selected from a database and/or determined by user input. In some variants, the target illumination spectrum associated with a given type of light source or application can be stored in memory and retrieved by a control and processing unit of the lighting system used to implement the method. In other variants, the target illumination spectrum can be determined, supplied, or otherwise provided by user input to the control and processing unit of the lighting system. In yet other variants, the target illumination spectrum can be selected from a plurality of possible target illumination spectra stored in memory. For example, possible target illumination spectra can be defined based on a standard illuminant (e.g., A, B, C, or D) or a correlated color temperature (CCT), whether on the Planckian locus or not. It is appreciated that CCT is a characteristic of visible light, which may not be appropriate to describe target illumination states encompassing non-visible light only.

Figure 4:
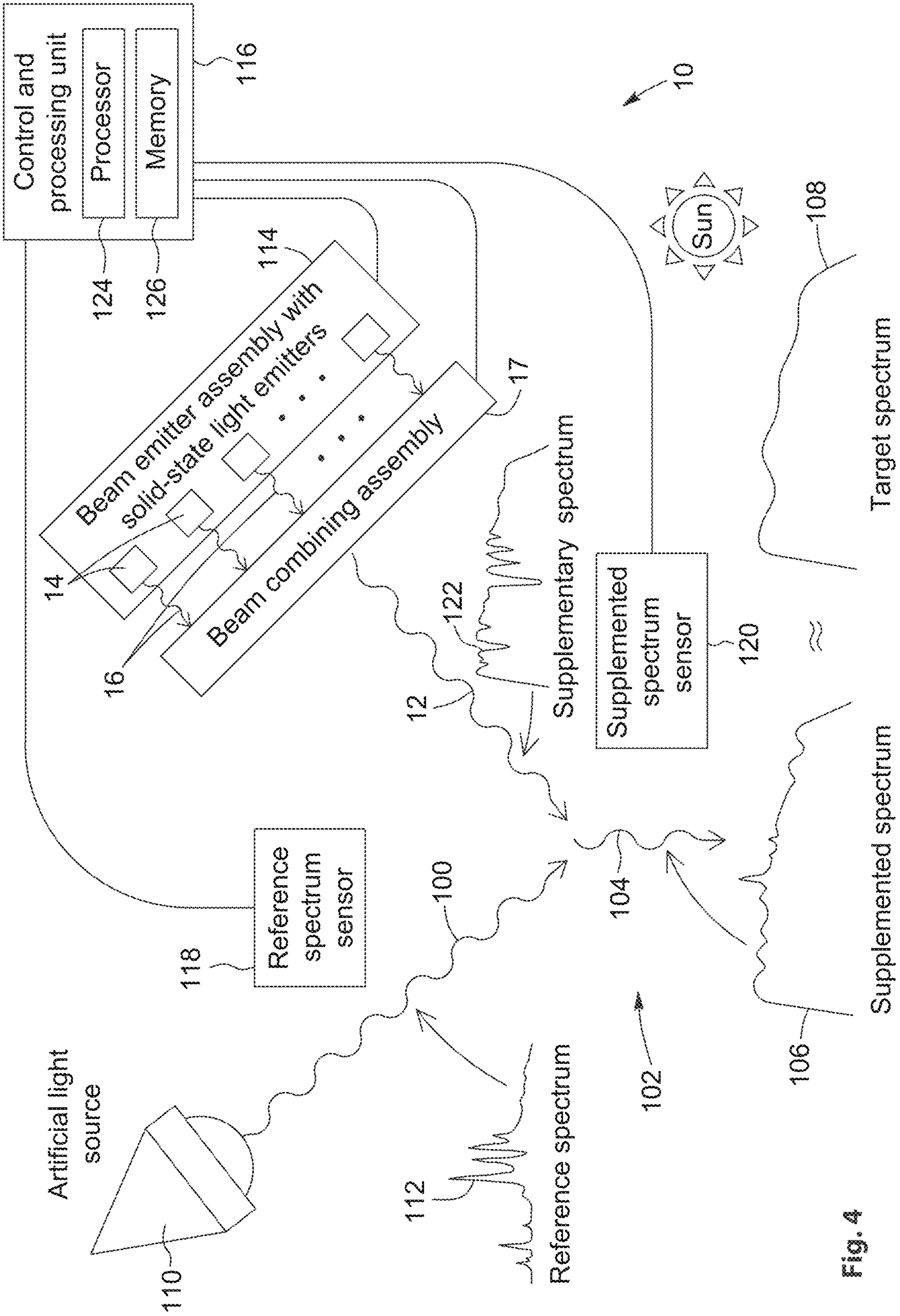
FIG. 4 is a schematic representation of a possible embodiment of a lighting system for supplementing a main illuminating light with a supplementary illuminating light to illuminate a space according to a target illumination spectrum.
Figure 5:
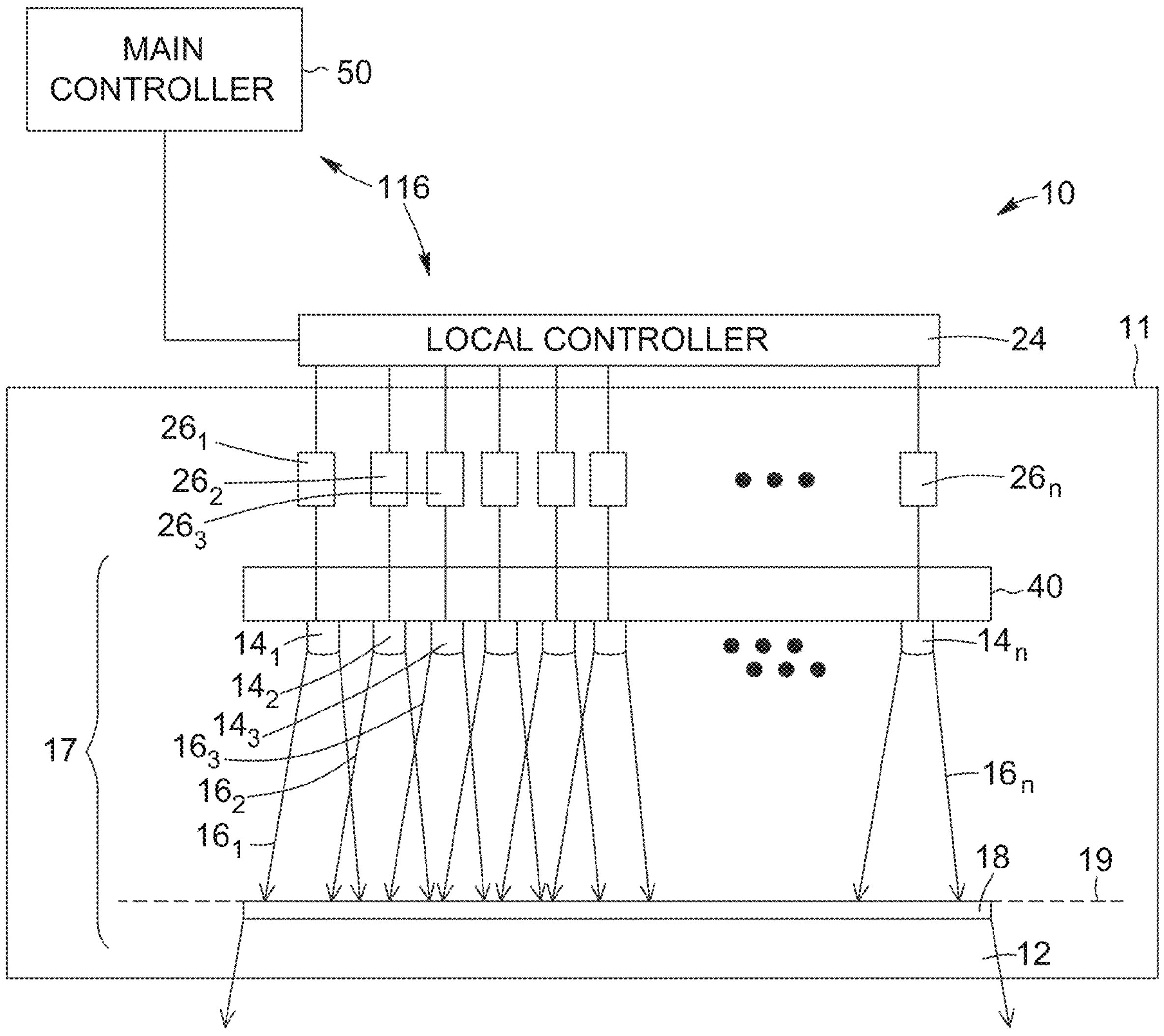
FIG. 5 is a schematic block diagram of another possible embodiment of a lighting system for supplementing a main illuminating light with a supplementary illuminating light to illuminate a space according to a target illumination spectrum.

The method 300 of FIG. 3 can be implemented using a lighting system such as the ones illustrated in FIGS. 4 and 5, or using another appropriate lighting system.

FIG. 4 is a schematic representation of a lighting system 10 for supplementing a main illuminating light 100 illuminating a space 102 with a supplementary illuminating light 12 to generate a supplemented illuminating light 104 having a supplemented illumination spectrum 106 that matches a target illumination spectrum 108. In FIG. 4, the main illuminating light 100 originates from an artificial light source 110 and is characterized by a reference illumination spectrum 112, while the target illumination spectrum 108 corresponds to a predetermined sunlight spectrum. However, as noted above, both the reference illumination spectrum 112 to be supplemented and the target illumination spectrum 108 to be achieved can correspond to any particular type of lighting source or combination of lighting sources—whether natural and/or artificial—appropriate or required for a particular application.

The lighting system 10 in FIG. 4 generally includes a beam emission assembly 114, a beam combining assembly 17, a control and processing unit 116, a reference spectrum sensor 118, and a supplemented spectrum sensor 120. These and other possible components of the lighting system 10 are described in greater detail below.

The beam emission assembly 114 includes a plurality of solid-state light emitters 14 configured to emit a respective plurality of emitter beams 16 to form the supplementary illuminating light 12. The plurality of emitter beams 16 have a respective plurality of emitter spectra, each of which characterized by an intensity level and a spectral shape or profile. The emitter spectra of the emitter beams 16 together define a supplementary illumination spectrum 122 of the supplementary illuminating light 12.

The beam combining assembly 17 is configured to receive the emitter beams 16 produced by the plurality of solid-state light emitters 14 and combine them into the supplementary illuminating light 12 to illuminate the space 102 together with the main illuminating light 100. The supplementary illuminating light 12 supplements the main illuminating light 100 to form the supplemented illuminating light 104.

The control and processing unit 116 is configured for controlling, monitoring, and/or coordinating, at least partly, the functions and operations of various components of the lighting system 10, such as, for example, the beam emission assembly 114, the beam combining assembly 17, the reference spectrum sensor 118, and the supplemented spectrum sensor 120. The control and processing unit 116 can also be configured to process and analyze sensor data measured by the reference spectrum sensor 118 and the supplemented spectrum sensor 120. In some instances, the control and processing unit 116 can also be referred to as a "computer device". In particular, as described in greater detail below, the control and processing unit 116 can be configured to perform the following functions: determine or receive the reference illumination spectrum 112 associated with the main illuminating light 100; determine a spectral deviation between the reference illumination spectrum 112 and the target illumination spectrum 108; and control the plurality of solid-state light emitters 14 by adjusting the plurality of emitter spectra to match the supplementary illumination spectrum 122 of the supplementary illuminating light 12 to the spectral deviation and illuminate the space 102 according to the target illumination spectrum 108. That is, if the supplementary illumination spectrum 122 matches the spectral deviation, then the supplemented illumination spectrum 106 matches the target illumination spectrum 108.

The control and processing unit 116 can be implemented in hardware, software, firmware, or any combination thereof, and be connected to various components of the lighting system 10 via wired and/or wireless communication links and ports to send and/or receive various types of electrical signals, such as timing and control signals, measurement signals, and data signals. The control and processing unit 116 may be controlled by direct user input or by programmed instructions, and may include an operating system for controlling and managing various functions of the lighting system 10. Depending on the application, the control and processing unit 116 can be fully or partially integrated with or physically separate from the other hardware components of the lighting system 10. In FIG. 4, the control and processing unit 116 generally includes a processor 124 and a memory 126.

The processor 124 may be able to execute computer programs, also generally known as commands, instructions, functions, processes, software codes, executables, applications, and the like. The term "computer program" is used in a generic sense to refer to any type of computer code (e.g. software or microcode) that can be employed to program the processor 124. The processor 124 may include a plurality of processing units. Such processing units may be physically located within the same device, or the processor 124 may represent processing functionality of a plurality of devices operating in coordination. For example, the control and processing unit 116 may include a main processor configured to provide overall control and one or more secondary processors configured for dedicated control operations or signal processing functions. Depending on the application, the processor 124 may include or be part of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor. It is appreciated that the terms "processor" and "controller" should not be construed as being limited to a single processor or a single controller, and accordingly, any known processor or controller architecture may be used.

The memory 126, which can also be referred to as a computer readable storage medium, is capable of storing computer programs and other data to be retrieved by the processor 124. In the present description, the terms "computer readable storage medium" and "computer readable memory" are intended to refer to a non-transitory and tangible computer product that can store and communicate executable instructions for the implementation of various steps of the methods disclosed herein. The computer readable memory can be any computer data storage device or assembly of such devices, including random-access memories (RAMs); dynamic RAMs; read-only memories (ROMs); magnetic storage devices, such as hard disk drives, solid state drives, floppy disks, and magnetic tapes; optical storage devices, such as compact discs (e.g., CDs and CDROMs), digital video discs (DVDs), and Blu-Ray™ discs; flash drive memories; and/or other non-transitory memory technologies. A plurality of such storage devices may be provided, as can be appreciated by those skilled in the art. The computer readable memory may be associated with, coupled to, or included in a computer or processor configured to execute instructions contained in a computer program stored in the computer readable memory and relating to various functions associated with the computer or processor.

The reference spectrum sensor 118 and the supplemented spectrum sensor 120 can be embodied by appropriate spectrally resolved sensor or combination of spectrally resolved sensors configured for collecting and measuring information, particularly real-time information, about the reference illumination spectrum 112 of the main illuminating light 100 and the supplemented illumination spectrum 106 of the supplemented illuminating light 104, respectively. In the present description, the term "spectrally resolved sensor" is intended to refer to any device or combination of devices configured for measuring or detecting a spectrally dependent response (e.g., as a function of frequency or wavelength over a certain spectral range) of an input signal. Non-limiting examples of spectrally resolved sensors or detectors that can be used for the reference spectrum sensor 118 and the supplemented spectrum sensor 120 include spectrometers, photometers (e.g., lux meters and PAR meters), photometric analyzers, on-chip multispectral sensors, phototransistors, pyrheliometers, and goniophotometers. Based on the measured spectra information, the control signals supplied to the plurality of solid-state light emitters 14 can be adjusted, for example in real time, to ensure that the match between the supplemented illumination spectrum 106 and the target illumination spectrum 108 persists over time during the operation of the lighting system 10. In other variants, a supplementary spectrum sensor may also or alternatively be provided for collecting and measuring information about the supplementary illumination spectrum 122 of the supplementary illuminating light 12.

In some embodiments, a plurality of reference spectrum sensors, and/or a plurality of supplemented spectrum sensors, and/or a plurality of supplementary spectrum sensors may be provided. For example, in one embodiment, a plurality of reference spectrum sensors may be provided to measure the reference illumination spectrum of the main illuminating light. The reference spectrum sensors may be disposed at different locations within the illuminated space. In such a case, the reference illumination spectrum may be determined by combining, according to different schemes, spectrum data measured from the plurality of reference spectrum sensors. Depending on the application, the measured spectra associated with different reference spectrum sensors may be given identical or different weights in the determination of the reference illumination spectrum of the main illuminating light. In another exemplary embodiment, a plurality of supplemented spectrum sensors may be provided to measure the supplemented illumination spectrum of the supplemented illuminating and assess whether it matches the target illumination spectrum. The supplemented spectrum sensors may be disposed at different locations within the illuminated space. In such a case, the supplemented illumination spectrum may be determined by combining, according to different schemes, spectrum data measured from the plurality of supplemented spectrum sensors. Depending on the application, the measured spectra associated with different supplemented spectrum sensors may be given identical or different weights in the determination of the supplemented illumination spectrum to be compared with the target illumination spectrum.

In some embodiments, a reference spectrum sensor may be used to obtain information about a main illuminating light, and this information can be sent to more than one lighting system, each lighting system including a set of solid-state light emitters and configured to provide its own supplementary illuminating light 12 according to a given target illumination spectrum, where different lighting systems may have different or identical target illumination spectra, as the case may be. For example, the target illumination spectrum associated with each lighting system may be defined according to the spatial location of the space illuminated by the lighting system.

Referring now to FIG. 5, there is illustrated a schematic block diagram of a lighting system 10, in accordance with another possible embodiment. As for the embodiment of FIG. 4, the lighting system 10 of FIG. 5 is configured for supplementing a main illuminating light with a supplementary illuminating light 12 to illuminate a space according to a target illumination spectrum. In particular, the supplementary illuminating light 12 has a supplementary illumination spectrum that matches a spectral discrepancy between a reference illumination spectrum of a main illumination and a target illumination spectrum to be achieved.

The lighting system 10 includes a lamp 11 having a plurality of solid-state light emitters $\mathbf{14}_1$, $\mathbf{14}_2$, . . . , $\mathbf{14}_n$ (hereinafter referred to generally and collectively as solid-state light emitters 14). As noted above, the solid-state light emitters 14 can be embodied by LEDs. Depending on the application, the number of solid-state light emitters 14 in the lighting system 10 can range between six and twenty, for example between eight and sixteen, although some embodiments can be operated outside this range. Each solid-state light emitter $\mathbf{14}_1$, $\mathbf{14}_2$, . . . , $\mathbf{14}_n$ is configured to emit an emitter beam $\mathbf{16}_1$, $\mathbf{16}_2$, . . . , $\mathbf{16}_n$ (hereinafter referred to generally and collectively as emitter beams 16) having an individual emitter spectrum. The individual emitter spectra of the emitter beams 16 collectively cover a spectral region encompassing the target illumination spectrum to be generated. In some embodiments, one or more of the solid-state light emitters 14 may be configured to emit visible light of a certain color including, but not limited to, violet, blue, cyan, green, yellow, amber, orange, red, and white. For example, in one embodiment, the solid-light emitters 14 can include at least one colored-light emitter and at least one white-light emitter. In another embodiment, one or more of the solid-state light emitters 14 may be configured to emit infrared radiation or ultraviolet radiation.

In one embodiment, the emitter spectrum of a solid-state light emitter 14 may have a center wavelength and spectral range such that it partially overlaps, for example at full width at half maximum (FWHM) or higher, with a spectrally adjacent individual emitter spectrum of another one of the solid-state light emitters 14. The expression "FWHM" is understood in the art to mean the extent of a function, given by the difference between the two extreme values of the independent variable at which the dependent variable is equal to half of its maximum value. In one example, the above condition may be achieved with solid-state light emitters 14 having individual emitter spectra characterized by an average FWHM of about 30 nm and a separation between adjacent center wavelengths of at most 15 nm. In implementations where solid-state light emitters 14 having broader spectra are used, the difference between adjacent center wavelengths could be larger. Depending on the application, each one of the solid-state light emitters 14 may have a unique emitter spectrum, or a subset of the solid-state light emitters 14 may have identical emitter spectra.

Referring still to FIG. 5, the lighting system 10 also includes a beam combining assembly 17. The beam combining assembly 17 is configured to combine the emitter beams 16 emitted by the solid-state light emitters 14 into an output light beam that forms the supplementary illuminating light 12. As noted above, the supplementary illuminating light 12 has a supplementary illumination spectrum defined from a combination of the individual emitter spectra of the emitter beams 16 provided by the plurality of solid-state light emitters 14. The beam combining assembly 17 can include any optical, mechanical, or optomechanical components, or combination of such components, configured to appropriately combine the plurality of emitter beams 16 into the supplementary illuminating light 12. In FIG. 5, the beam combining assembly 17 includes a support structure 40 on which the solid-state light emitters 14 are mounted, and preferably positioned such that the emitter beams 16 are emitted toward a common diffusing plane 19. The beam combining assembly 17 also include a diffuser 18 extending along the diffusing plane 19. Depending on the application, the diffuser 18 may be embodied by any optical component or combination of optical components configured to blend the emitter beams 16 into an output light beam defining the supplementary illuminating light 12. For example, the diffuser 18 can be embodied by sandblasted glass or plastic, or other types of light-mixing optics. The diffuser 18 may be oriented to direct the supplementary illuminating light 12 onto an object or surface in the space to be illuminated.

In some variants, for example if the object or surface to be illuminated is sufficiently distanced from the lighting system 10, the beam combining assembly 17 may not include components to blend the emitter beams 16 from the individual solid-state light emitters 14 together, but instead may simply direct the emitter beams 16 along a common optical path. In one example, the emitter beams 16 emitted by the solid-state light emitter 14 may be directed by angled reflectors (not shown). In another example, filters and/or coatings (not shown) may be provided on the solid-state light emitters 14 and/or the diffuser 18 to spectrally condition the supplementary illuminating light 12 by adding, modifying, reducing, and/or eliminating spectral components of the individual emitter spectra.

Referring still to FIG. 5, the lamp 11 can further include a local controller 24 to control, at least partly, the operation of the solid-state light emitters 14. The local controller 24 may be a processor or a microcontroller, non-limiting examples of which include an ATmega328 microcontroller, an Intel MCS-51 microcontroller, a PIC microcontroller, a Texas Instruments MSP430 microcontroller, and an ARM processor. The local controller 24 may send, as input signals, a set of control or driving parameters to a set of emitter drivers $\mathbf{26}_1$, $\mathbf{26}_2$, . . . , $\mathbf{26}_n$ (hereinafter referred to generally and collectively as emitter drivers 26), each associated with a corresponding one of the solid-state light emitters $\mathbf{14}_1$, $\mathbf{14}_2$, . . . , $\mathbf{14}_n$. Each emitter driver 26 can supply a driving current to the corresponding solid-state light emitter 14 to cause the solid-state light emitter 14 to generate the corresponding emitter beam 16.

As known in the art, a solid-state emitter 14 such as an LED generates light when a current is driven across its p-n junction. The intensity of the light generated by the LED is thus correlated to the amount of current driven through the diode. In one variant, the local controller 24 controls the solid-state light emitters 14 according to a pulse-width modulation (PWM) scheme, which is a known method of controlling the current driven through an LED to achieve desired intensity and/or color mixing. A PWM scheme alternately pulses the LED to a full-current "ON" state, followed by a zero-current "OFF" state. Depending on the input command, the average luminous power emitted by the LEDs can be proportionally increased or decreased by controlling the variation of the duty cycle between 0% and 100%. The intensity and the temperature of the LEDs may thus be controlled by the PWM signals supplied to the plurality of emitter drivers 26. Each emitter driver 26 then sends its own PWM current pulse to its associated solid-state light emitter 14. The luminous intensity of the resultant emitter beams 16 may be individually adjusted by independently applying particular drive currents to the respective solid-state light emitters 14 according to the driving signals supplied from the corresponding emitter driver 26. Thus, the intensity of light from each solid-state light emitter 14 may be adjusted to power the solid-state light emitter 14 high or low for generating the supplementary illuminating light 12. Preferably, the driving signals from each emitter driver 26 supplied to the corresponding solid-state light emitter 14 are individually controlled, so that the resulting supplementary illumination spectrum of the supplementary illuminating light 12 matches the spectral deviation between the reference illumination spectrum of the main illuminating light and the target illumination spectrum to be achieved.

In one embodiment, the frequency of the PWM signals may be adjustable from 25 Hz to 100 kHz, for example between 100 Hz and to 10 kHz, for implementing certain lighting functions, such as a dimming function. In one embodiment, a high PWM frequency may be employed, for example ranging between 150 Hz and 1 kHz), such that the on-and-off flickering of the solid-state light emitters 14 is generally not perceptible to the naked eye.

The intensities of the individual emitter spectra of the emitter beams 16 emitted by the solid-state light emitters 14 may be dependent on different working temperatures and different PWM values. It is appreciated, however, that the driving of the solid-state light emitters 14 by the drivers 26 is not limited to a PWM approach, and that other driving schemes may be used depending on the application. In one variant, linear current signals may be provided to the solid-state light emitters 14. In another variant, the current signals provided to the solid-state light emitters 14 may be controlled using built-in mathematical equations and a light-emitter parameter database containing information such as luminous efficacy, intensity-temperature relationships, color shift-temperature relationships, the eight nominal CCT quadrangles, and the like, to individually and proportionally control the intensities of the solid-state light emitters 14.

Referring still to FIG. 5, the lighting system 10 includes, in addition to the local controller 24 provided proximate or integrated to the lamp 11, a separate main controller 50. In one embodiment, the main controller 50 may be remotely located and configured to control a plurality of lamps 11 such as the one shown in FIG. 5. However, in other embodiments, a single controller may be associated with a single lamp and perform all the associated controlling functions.

Returning to FIG. 3, the method 300 can include a step 302 of determining or receiving, for example by a processor, a reference illumination spectrum associated with the main illuminating light. As noted above, depending on the application, the main illuminating light can emanate from one or more natural light sources, one or more artificial light sources, or a combination of at least one natural light source and at least one artificial light source. As used herein, the phrase "determining or receiving a reference illumination spectrum" is used broadly to encompass, without being limited to, providing, acquiring, making available for use, obtaining, assessing, accessing, supplying, assigning, retrieving, setting, selecting, computing, calculating, and deriving the reference illumination spectrum.

In accordance with the present techniques, two main classes of embodiments of determining or receiving the reference illumination spectrum may be considered. The two classes of embodiments differ depending on whether the determined or received reference illumination spectrum is established based on information or data about main illuminating light obtained prior to or while performing the method 300.

In the first class of embodiments, the determining or receiving step 302 can involve retrieving or receiving a predefined or predetermined reference illumination spectrum, for example from a storage location. The reference illumination spectrum may be stored as an array of numbers that represent the relative or absolute spectral power distribution of the main illuminating light as a function of wavelength, frequency, or another suitable spectral parameter. Depending on the application, the reference illumination spectrum can be retrieved or received from various types of storage locations, such as a simple file, a database, a virtual library, a storage medium, a local memory system, a server, a cloud computing resource, a network, a peer-to-peer structure, a blockchain, and so forth. In one embodiment, the reference illumination spectrum can be selected from a database containing a plurality of predefined illumination spectra, as either one or a combination of one or more of the plurality of predefined illumination spectra. In embodiments where the main illuminating light originates from an artificial light source, the reference illumination spectrum can be a pre-programmed or pre-calibrated illumination spectrum stored in a memory of the artificial light source. In some embodiments, the main illuminating light may originate from a plurality of artificial light sources. For example, some horticultural applications use a combination of HPS lamps with warm white, cool white, red, and blue LEDs. In such a case, the reference illumination spectrum can be obtained as a combination of predetermined illumination spectra associated with the plurality of artificial light sources. In the case where the main illuminating light originates from a natural light source (e.g., sunlight or moonlight), the reference illumination spectrum may also be a preset or known illumination spectrum, which can be retrieved or received from a simple file, a database, a virtual library, or a storage medium.

Still according to the first class of embodiments, in some scenarios, the reference illumination spectrum can be determined by a processor, based on one or more predictive or condition-dependent factors related to the space to be illuminated, that is, where and when the method 300 is to be carried out. Such predictive or condition-dependent factors can include geographical information (e.g., latitude, longitude, and altitude), temporal information (e.g., with respect to the time of day or the time of year), current and/or forecast weather information, pollution level, the tilt of the Earth with respect to the Sun, turbidity, albedo, ozone level, atmospheric absorption, air density, and the like. Information regarding one or more predictive or condition-dependent factors can be transmitted through suitable wired and/or wireless communication channels to a processor. Based on the received information, the processor can determine a reference illumination spectrum associated with the main illuminating light, for example by calculation or selection of a best match among a plurality of possible illumination spectra stored in a spectrum library or database. In some embodiments, the determined or received reference illumination spectrum can be updated over time during the implementation of the method 300, as new information about relevant predictive factors, for example related to current or forecast weather conditions, becomes available. In some embodiments, dedicated sensors or instruments may be provided for carrying out measurements, possibly in real-time, that can be processed to convey information about current or forecast weather conditions, which in turn can be used to update the reference illumination spectrum over time. For example, in some greenhouse lighting applications, sensing devices may be provided inside a greenhouse to monitor cloud coverage and measure cloud coverage data that can be used to determine real-time information about the reference illumination spectrum.

In contrast, in the second class of embodiments, the determining or receiving step 302 can involve using sensors and detectors to gather information about the reference illumination spectrum associated with the main illuminating light. For example, the determining or receiving step 302 can include using a spectrally resolved sensor to measure a spectral response of the main illuminating light, and determining the reference illumination spectrum from the measured spectral response of the main illuminating light. As noted above, non-limiting examples of sensors and detectors that can be used according to the present techniques include spectrometers, photometers (e.g., lux meters and PAR meters), photometric analyzers, on-chip multispectral sensors, phototransistors, pyrheliometers, and goniophotometers. By receiving real-time information about the main illuminating light, whether of natural and/or artificial origin, a processor can be used to compute, derive, or otherwise obtain its associated reference illumination spectrum.

Referring still to FIG. 3, the method 300 also includes a step 304 of determining a spectral deviation between the reference illumination spectrum and the target illumination spectrum. In the present description, the term "spectral deviation" is a broad term that is intended to refer to a difference, a discrepancy, a divergence, or a variation, over a certain spectral range, between the reference illumination spectrum of the main illuminating light and the target illumination spectrum to be achieved. That is, the spectral deviation is meant to represent the amount or degree by which the reference illumination spectrum differs from the target illumination spectrum. As noted above, the supplementary illuminating light produced by the plurality of solid-state light emitters supplements the main illuminating light and has a supplementary illumination spectrum that is adjusted to compensate for the spectral deviation between the reference illumination spectrum and the target illumination spectrum. Depending on the application, the spectral deviation spectrum may vary or be constant as a function of time over an illumination period during which the method is implemented. Furthermore, it is appreciated that the reference illumination spectrum and the target illumination spectrum can deviate from each other in terms of their intensity levels or their spectral shapes, or both their intensity levels and their spectral shapes. In some embodiments, the spectral deviation between the reference illumination spectrum and the target illumination spectrum can be obtained by subtracting, canceling, or otherwise removing the reference illumination spectrum from the target illumination spectrum over a certain spectra range. In some embodiments, the spectral range in which the spectral deviation is nonzero or nonnegligible may encompass all or nearly all of the reference illumination spectrum. However, in other embodiments, the spectral range in which the spectral deviation is nonzero or nonnegligible may encompass only a limited portion of the reference illumination spectrum. For example, in one variant, the reference illumination spectrum may extend throughout the visible region of the electromagnetic spectrum, while the spectral deviation may nonzero or nonnegligible only in a portion of the visible region, such as between about 400 nm and 550 nm. In such a case, the supplementary illumination spectrum of the supplementary illuminating light is narrower than the reference illumination spectrum of the main illuminating light.

The method 300 further includes a step 306 of controlling the plurality of solid-state light emitters to emit a respective plurality of emitter beams that forms the supplementary illuminating light and illuminates the space along with the main illuminating light. The plurality of emitter beams has a respective plurality of emitter spectra that defines a supplementary illumination spectrum of the supplementary illuminating light. In general, the individual emitter spectrum associated with each solid-state light emitter is assumed to be known prior to starting the method 300. The step 306 of controlling the plurality of solid-state light emitters includes adjusting the plurality of emitter spectra to match the supplementary illumination spectrum of the supplementary illuminating light to the spectral deviation and illuminate the space according to the target illumination spectrum. In the present description, the expression “adjusting the plurality of emitter spectra” is intended to encompass adjusting the plurality of emitter spectra individually, collectively, or partly individually and partly collectively. This expression is also intended to encompass adjusting each emitter spectra in terms of its absolute intensity level or its relative spectral shape, or both its intensity level and its spectral shape. It is appreciated that achieving a match between the supplementary illumination spectrum of the supplementary illuminating light and the spectral deviation between the reference illumination spectrum and the target illumination spectrum causes the supplemented illumination spectrum of the supplemented illuminating light to match the target illumination spectrum. That is, the solid-state light emitters are configured to generate missing, lacking, or insufficiently represented spectral components of the reference illumination spectrum, such that the superposition or combination of the reference illumination spectrum and the supplementary illumination spectrum yields a supplemented illumination spectrum that matches the target illumination spectrum. Depending on the application, for example depending on whether the space under illumination is a spatially resolved location or a general environment, the spatial dependence of the magnitude of each of the reference and supplementary illumination spectra may have to be considered for the supplemented illumination spectrum to match the target illumination spectrum at the desired location within the space.

As noted above, the terms “match”, “matching” and “matched” are meant to encompass not only an exact or identical match between the supplementary illumination spectrum of the supplementary illuminating light and the spectral deviation, likewise between the supplemented illumination spectrum of the supplemented illuminating light and the target illumination spectrum, but also a substantial, approximate, subjective, sufficient, or acceptable match, as well as a higher or best match among a plurality of matching possibilities. For example, the supplemented illumination spectrum may be either the same or within some predetermined tolerance of the target illumination spectrum, for example within a five to ten percent error, where the error can be defined in any suitable form. In some embodiments, it may suffice that the general spectral shape or profile of the target illumination spectrum be reproduced in the supplemented illumination spectrum in order for the eye to perceive the same—or nearly the same—illumination spectrum, thus providing a suitable match. Eye perception can vary among different people. Furthermore, the present techniques contemplate not only scenarios where the match between the supplemented illumination spectrum and the target illumination spectrum is absolute, but also scenarios where the match is relative (i.e., in terms of normalized spectra). In some embodiments, the supplemented illumination spectrum may be measured at a plurality of distinct locations within the illuminated space. In such embodiments, it may be determined that the supplemented illumination spectrum matches the target illumination spectrum if a matching criteria is satisfied at least at a predetermined sufficient number of the plurality of locations within the space.

In one embodiment, the step 306 of controlling the plurality of solid-state light emitters can include adjusting relative intensity levels of the emitter beams emitted by the plurality of solid-state light emitters to generate the supplementary illuminating light to match the spectral deviation. In particular, controlling the plurality of solid-state light emitters can include determining or receiving a set of control parameters for the plurality of solid-state light emitters, and driving the plurality of solid-state light emitters according to the set of control parameters to generate the supplementary illuminating light in accordance with the spectral deviation determined at step 304. For example, the set of control parameters can be a set of individual PWM signals with which to drive the solid-state light emitters.

The determination of the set of control parameters for the plurality of solid-state light emitters that produces a supplementary illuminating light having a supplementary illumination spectrum that matches the determined spectral deviation can be based on pre-calibration, spectrum fitting techniques, or other approaches that rely on the individual emitter spectra of the plurality of solid-state light emitters as known input parameters.

In the case of the first class of embodiments described above, in which the reference illumination spectrum is determined or received prior to illuminating the space, with or without consideration of predictive or condition-dependent factors, the set of control parameters with which to drive the plurality of solid-state light emitters to achieve the desired supplementary illumination spectrum can be stored in a non-volatile memory accessible to the controller that drives the solid-state light emitters. In scenarios where the determined or received reference illumination spectrum is modified during the implementation of the method 300 based, for example, on updated information about condition-dependent factors, the desired supplementary illumination spectrum can be recalculated, and its value stored in memory.

In the case of the second class of embodiments described above, in which the reference illumination spectrum is determined in real time, or near real time, as the method 300 is performed (e.g., using spectrally resolved sensors, such as reference spectrum sensor 118 in FIG. 4), the spectral deviation between the target illumination spectrum and the reference illumination spectrum can also be determined in real or near real time. Upon receiving the current spectral deviation to be achieved by the supplementary illumination spectrum of the supplementary illuminating light, the controller can adjust the set of control parameters for the plurality of solid-state light emitters accordingly.

For example, in some embodiments, the step 304 of determining the spectral deviation between the reference illumination spectrum and the target illumination spectrum can include monitoring the spectral deviation for changes over time, for example by continuous or intermittent real-time measurements of the reference illumination spectrum, the supplementary illumination spectrum, and/or a combination of the reference illumination spectrum and the supplementary illumination spectrum (i.e., the supplemented illumination spectrum). In such embodiments, the step 306 of controlling the plurality of solid-state light emitters can include, upon detection that the spectral deviation has changed, adjusting the plurality of emitter spectra to keep the supplementary illumination spectrum matched to the spectral deviation. It is appreciated that the plurality of emitter spectra may be adjusted only if the detected change in the spectral deviation exceeds a certain threshold.

Depending on the application, the set of control parameters can be adjusted in real or near real time, according to different refresh rates and different update thresholds. In the present description, the terms "real time" and "near real time" are used as practical terms that depend on the particular implementation of the method 300. These terms of degree generally refer to the fact that the method 300 can sense, determine and adjust variable illuminating conditions seamlessly, with negligible or insignificant time lag on the typical scale of human perception.

In some embodiments, in addition to or instead of monitoring the main illuminating light to determine its illumination spectrum, the method 300 can include a step of monitoring the supplemented illuminating light by measuring, in real or near real time or, its illumination spectrum to verify that it does indeed match the target illumination spectrum (e.g., using spectrally resolved sensors, such as supplemented spectrum sensor 120 in FIG. 4). That is, the monitoring of the supplemented illumination spectrum and the finding of any mismatch relative to the desired target illumination spectrum can provide a feedback signal. This feedback signal can be supplied to the controller to further adjust the set of control parameters driving the solid-state light emitters to correct or modify the supplementary illumination spectrum of the supplementary illuminating light for attempting to relieve, compensate, or reduce the observed mismatch.

Figure 6:
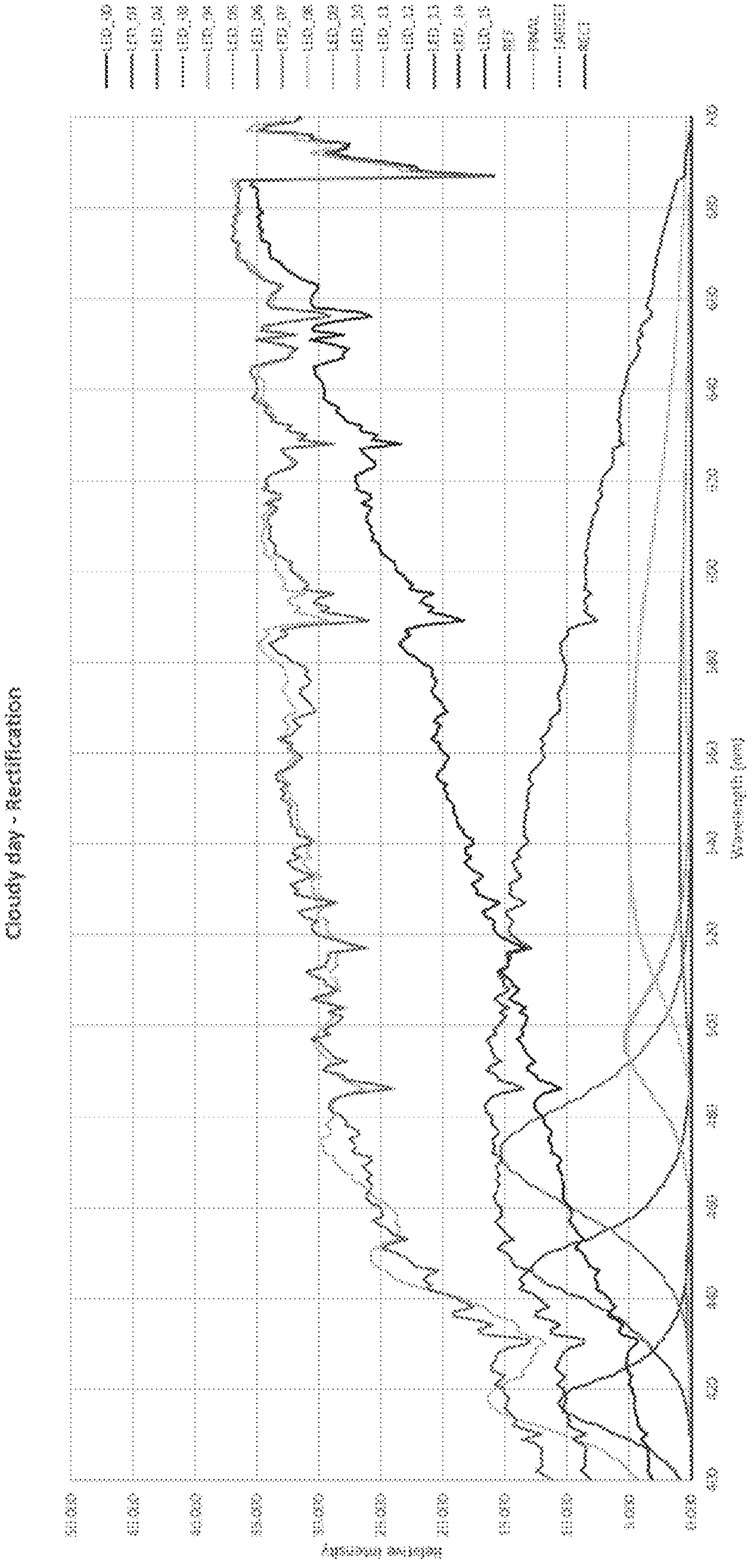
FIG. 6 is a graph showing a number of illumination spectra plotted as a function of wavelength between 400 and 700 nm. "REF": reference illumination spectrum of a main illuminating light corresponding to sunlight under cloudy conditions, which was simulated based on known information about the main illuminating light. "TARGET": target illumination spectrum to be achieved, corresponding to sunny conditions at around 10 a.m., which was predetermined by user input. "RECT": desired supplementary illumination spectrum of a supplementary illuminating light to be generated by a set of sixteen LEDs, where the supplementary illumination spectrum was obtained by subtracting the reference illumination spectrum ("REF") from the target illumination spectrum ("TARGET"). "LED_00" to "LED_15": individual emitter spectra of sixteen emitter beams generated by the set of sixteen LEDs, whose relative intensities were calculated based on experimentally characterized LED spectral shapes, in an attempt to fulfill the condition that their sum yield an illumination spectrum corresponding to the desired illumination spectrum ("RECT"). "FINAL": supplemented illumination spectrum corresponding to the combination of the reference illumination spectrum ("REF") of the main illuminating light and the sum of the individual emitter spectra ("LED_00" to "LED_15") of the emitter beams from the sixteen LEDs.
Figure 7:
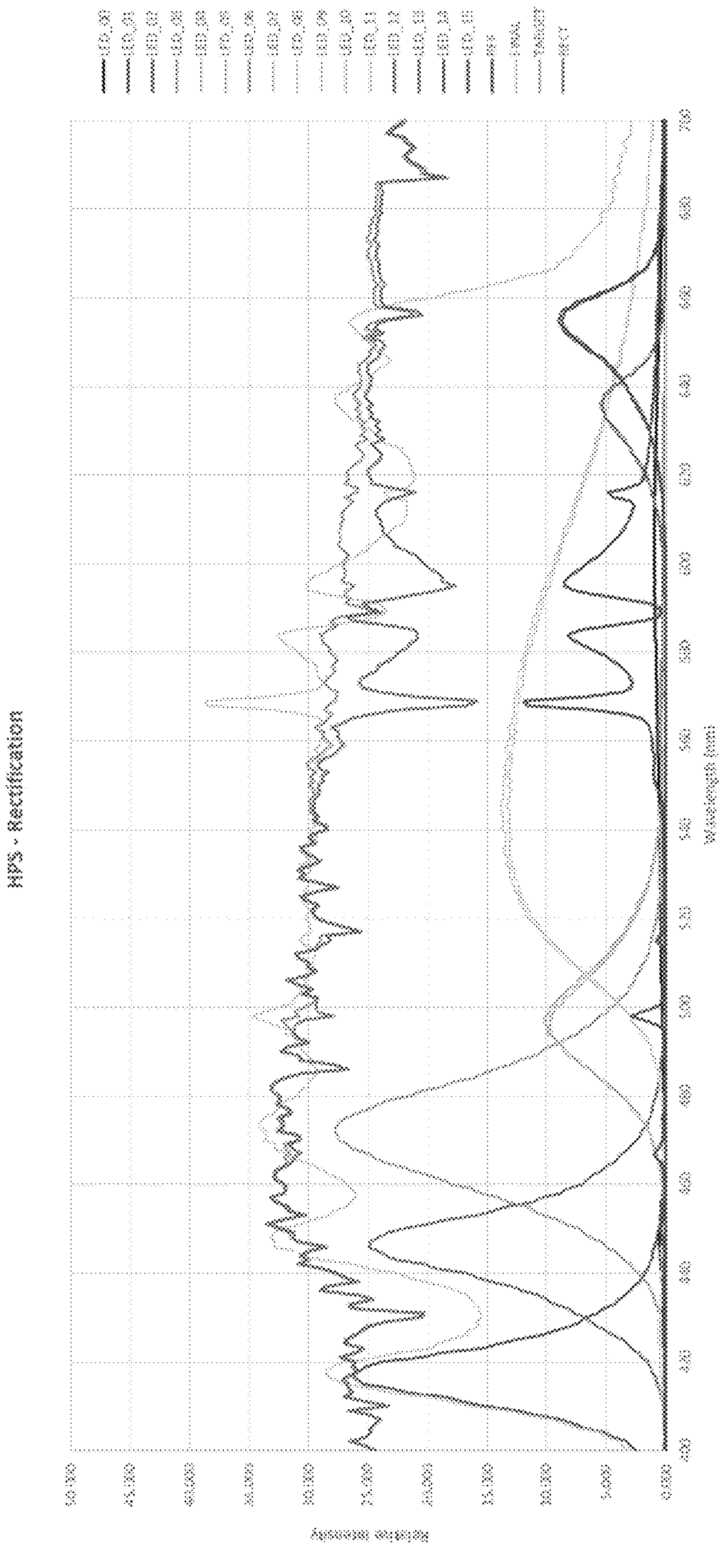
FIG. 7 is a graph showing a number of illumination spectra plotted as a function of wavelength between 400 and 700 nm. "REF": reference illumination spectrum of a main illuminating light produced by an HPS lamp, which was simulated based on known information about the main illuminating light. "TARGET": target illumination spectrum to be achieved, corresponding to CIE Standard Illuminant D65 (CCT: 6500 K), which was predetermined by user input. "RECT": desired supplementary illumination spectrum of a supplementary illuminating light to be generated by a set of sixteen LEDs, where the supplementary illumination spectrum was obtained by subtracting the reference illumination spectrum ("REF") from the target illumination spectrum ("TARGET"). "LED_00" to "LED_15": individual emitter spectra of sixteen emitter beams generated by the set of sixteen LEDs, whose relative intensities were calculated based on experimentally characterized LED spectral shapes, in an attempt to fulfill the condition that their sum yield an illumination spectrum corresponding to the desired illumination spectrum ("RECT"). "FINAL": supplemented illumination spectrum corresponding to the combination of the reference illumination spectrum ("REF") of the main illuminating light and the sum of the individual emitter spectra ("LED_00" to "LED_15") of the emitter beams from the sixteen LEDs.

Referring to FIGS. 6 and 7, some capabilities of the present techniques in terms of supplementing the spectral content of a main illuminating light with solid-state light emitters in order to achieve a target illumination spectrum are illustrated. Each of FIGS. 6 and 7 is a graph showing a number of illumination spectra plotted as a function of wavelength between 400 and 700 nm. The illustrated spectra are as follows. "REF": a reference illumination spectrum of a main illuminating light, which was simulated based on known information about the main illuminating light. "TARGET": a target illumination spectrum to be achieved, which was predetermined by user input. "RECT": a desired supplementary illumination spectrum of a supplementary illuminating light to be generated by a set of sixteen LEDs, which was obtained by subtracting the reference illumination spectrum ("REF") from the target illumination spectrum ("TARGET"). "LED_00" to "LED_15": individual emitter spectra of sixteen emitter beams generated by the set of sixteen LEDs, whose relative intensities were calculated based on experimentally characterized LED spectral shapes, in an attempt to fulfill the condition that their sum yield an illumination spectrum corresponding to the desired illumination spectrum ("RECT"). "FINAL": a supplemented illumination spectrum ("FINAL") corresponding to the combination of the reference illumination spectrum ("REF") of the main illuminating light and the sum of the individual emitter spectra ("LED_00" to "LED_15") of the emitter beams from the sixteen LEDs.

In FIG. 6, the main illuminating light ("REF") is sunlight on a cloudy day and the target illumination spectrum ("TARGET") to be achieved corresponds to sunny conditions at around 10 a.m. In FIG. 7, the main illuminating light ("REF") is produced by a conventional HPS lamp and the target illumination spectrum ("TARGET") to be achieved corresponds to CIE Standard Illuminant D65 (CCT: 6500 K). In both cases, the sum of the individual emitter spectra from the sixteen LEDs ("LED_00" to "LED_15") yields, when combined to the reference illumination spectrum ("REF") associated with the main illuminating light, a supplemented illumination spectrum ("FINAL) that closely matches the target illumination spectrum ("TARGET").

In accordance with another aspect of the present description, there is provided a method of controlling a lighting system for supplementing a main illuminating light with a supplementary illuminating light to illuminate a space according to a target illumination spectrum. As described above, the lighting system can include a plurality of solid-state light emitters, for example LEDs. The plurality of solid-state light emitters is configured to emit a respective plurality of emitter beams forming the supplementary illuminating light and illuminating the space along with the main illuminating light. The plurality of emitter beams has a respective plurality of emitter spectra together defining a supplementary illumination spectrum of the supplementary illuminating light. In some embodiments, the lighting system can also include a beam combining assembly configured to combine the emitter beams emitted by the plurality of solid-state light emitters into the supplementary illuminating light for illumination of the space together with the main illuminating light. The method can include steps of determining or receiving a reference illumination spectrum associated with the main illuminating light; determining a spectral deviation between the reference illumination spectrum and the target illumination spectrum; and controlling the plurality of solid-state light emitters by adjusting the plurality of emitter spectra to match the supplementary illumination spectrum of the supplementary illuminating light to the spectral deviation and illuminate the space according to the target illumination spectrum. These three steps can be carried out similarly to steps 302, 304, and 306 described above with reference to FIG. 3.

In accordance with another aspect of the present description, there is provided a non-transitory computer readable storage medium having stored thereon computer executable instructions that, when executed by a processor, cause the processor to perform a method of controlling a lighting system as described herein. The method can be performed for supplementing a main illuminating light with a supplementary illuminating light from a plurality of solid-state light emitters of the lighting system to illuminate a space according to a target illumination spectrum. As noted above, the terms "computer readable storage medium" and "computer readable memory" are intended to refer to a non-transitory and tangible computer product that can store and communicate executable instructions for the implementation of various steps of the method disclosed herein. As noted above, the computer readable memory can be any computer data storage device or assembly of such devices, various non-limiting examples of which are mentioned above. A plurality of such storage devices may be provided, as can be appreciated by those skilled in the art. The computer readable memory may be associated with, coupled to, or included in a computer or processor configured to execute instructions contained in a computer program stored in the computer readable memory and relating to various functions associated with the computer.

In accordance with another aspect of the present description, there is provided a computer device for use with a lighting system. The computer device can include a processor and a non-transitory computer readable storage medium operatively coupled to the processor and having stored thereon computer readable instructions that, when executed by a processor, cause the processor to perform various steps of the methods disclosed herein.

Of course, numerous modifications could be made to the embodiments described above without departing from the scope of the appended claims.

The invention claimed is:

1. A method of supplementing a main illuminating light with a supplementary illuminating light to illuminate a space according to a target illumination spectrum, the method comprising:
- measuring a reference illumination spectrum of the main illuminating light with at least one reference spectrum sensor disposed within the space;
- collecting information about a supplementary illumination spectrum of the supplementary illuminating light with at least one supplementary spectrum sensor; and
- upon identification of a spectral deviation between the reference illumination spectrum and the target illumination spectrum:
  - illuminating the space with a supplemented illuminating light, the supplemented illuminating light comprising the main illuminating light and the supplementary illuminating light, according to the target illumination spectrum; and
  - providing a feedback signal representative of at least one property of the supplemented illuminating light to at least one of: the main illuminating light and the supplementary illuminating light to maintain the supplementary illumination spectrum matched to the spectral deviation, based on measured spectra information by said at least one reference spectrum sensor and/or said at least one supplementary spectrum sensor.

2. The method of claim 1, wherein the supplemented illuminating light is representative of lighting conditions on Earth, the lighting conditions on Earth being representative of a time of day, a time of year, a geographical location, meteorological conditions, or a combination thereof.

3. The method of claim 1, further comprising selecting the target illumination spectrum to correspond to a combination of natural light and artificial light.

4. The method of claim 1, wherein the target illumination spectrum encompasses non-visible light wavelengths.

5. The method of claim 1, wherein the target illumination spectrum has a color temperature ranging from about 1500 K to about 8000 K.

6. The method of claim 1, further comprising updating the reference illumination spectrum over time based on changes in the one or more predictive factors, wherein the one or more predictive factors are based on geographical information, temporal information, weather information, or a combination thereof.

7. A method of supplementing a main illuminating light with a supplementary illuminating light to illuminate a space according to a target illumination spectrum, the method comprising:
- measuring a reference illumination spectrum of the main illuminating light with at least one reference spectrum sensor disposed within the space; and
- upon identification of a spectral deviation between the reference illumination spectrum and the target illumination spectrum:
  - illuminating the space with a supplemented illuminating light, the supplemented illuminating light comprising the main illuminating light and the supplementary illuminating light, according to the target illumination spectrum; and
  - providing a feedback signal representative of at least one property of the supplemented illuminating light to at least one of: the main illuminating light and the supplementary illuminating light to maintain the supplementary illumination spectrum matched to the spectral deviation, based on measured spectra information by said at least one reference spectrum sensor.

8. A lighting system for supplementing a main illuminating light with a supplementary illuminating light to illuminate a space according to a target illumination spectrum, the lighting system comprising:
- a plurality of solid-state light emitters configured to emit a respective plurality of emitter beams forming the supplementary illuminating light and illuminating the space along with the main illuminating light, the plurality of emitter beams having a respective plurality of emitter spectra together defining a supplementary illumination spectrum of the supplementary illuminating light;
- a control and processing unit operatively coupled to the plurality of solid-state light emitters, the control and processing unit being configured to:
  - determine or receive a reference illumination spectrum associated with the main illuminating light;
  - determine a spectral deviation between the reference illumination spectrum and the target illumination spectrum; and control the plurality of solid-state light emitters by adjusting the plurality of emitter spectra to match the supplementary illumination spectrum to the spectral deviation and illuminate the space with a supplemented illuminating light, the supplemented illuminating light comprising the main illuminating light and the supplementary illuminating light, according to the target illumination spectrum;

at least one reference spectrum sensor disposed within the space to measure the reference illumination spectrum of the main illuminating light; and at least one supplementary spectrum sensor for collecting information about the supplementary illumination spectrum of the supplementary illuminating light;

wherein upon identification of the spectral deviation between the reference illumination spectrum and the target illumination spectrum, the control and processing unit is configured to provide a feedback signal representative of at least one property of the supplemented illuminating light to at least one of the main illuminating light and the supplementary illuminating light to maintain the supplementary illumination spectrum matched to the spectral deviation, based on measured spectra information by said at least one reference spectrum sensor and/or said at least one supplementary spectrum sensor.

9. The lighting system of claim 8, wherein the plurality of solid-state light emitters comprises a semiconductor light-emitting diode, a semiconductor laser diode, a vertical-cavity surface-emitting laser, an organic light-emitting diode, a polymer light-emitting diode, or a combination thereof.

10. The lighting system of claim 8, wherein a number of the plurality of solid-state light emitters ranges between six and twenty.

11. The lighting system of claim 8, wherein at least one of the emitter spectra encompasses visible light wavelengths.

12. The lighting system of claim 8, wherein at least one of the emitter spectra encompasses non-visible light wavelengths.

13. The lighting system of claim 8, wherein the plurality of solid-state light emitters includes at least one colored-light emitter.

14. The lighting system of claim 8, wherein the plurality of solid-state light emitters includes at least one white-light emitter.

15. The lighting system of claim 8, wherein the control and processing unit is configured to select the target illumination spectrum to replicate artificial light.

16. The lighting system of claim 8, wherein the control and processing unit is configured to select the target illumination spectrum as a time-varying quantity over an illumination period.

17. The lighting system of claim 8, wherein the control and processing unit is configured to monitor the spectral deviation over time for changes, and upon detection that the spectral deviation has changed, adjust the plurality of emitter spectra to keep the supplementary illumination spectrum matched to the spectral deviation.

18. The lighting system of claim 8, further comprising at least one spectrally resolved sensor to perform continuous or intermittent real-time measurements of the reference illumination spectrum, the supplementary illumination spectrum, or both the reference illumination spectrum and the supplementary illumination spectrum, wherein the control and processing unit is configured to monitor the spectral deviation over time for changes based on the continuous or intermittent real-time measurements.

19. The lighting system of claim 8, wherein the control and processing unit is configured to adjust the plurality of emitter spectra by individually adjusting an intensity level of each emitter spectra.

20. The lighting system of claim 8, further comprising a beam combining assembly configured to combine the emitter beams emitted by the plurality of solid-state light emitters into the supplementary illuminating light.

* * * * *